US010924563B2

United States Patent
Kim et al.

(10) Patent No.: US 10,924,563 B2
(45) Date of Patent: Feb. 16, 2021

(54) METHOD, SYSTEM AND RECORDING MEDIUM FOR PROVIDING REAL-TIME CHANGE IN SEARCH RESULT

(71) Applicant: NAVER Corporation, Seongnam-si (KR)

(72) Inventors: Taek-In Kim, Seongnam-si (KR); Jae Keol Choi, Seongnam-si (KR); Hyungae Park, Seongnam-si (KR); Minjin Choi, Seongnam-si (KR); Sungmo Hong, Seongnam-si (KR); Byungki Kim, Seongnam-si (KR)

(73) Assignee: NAVER CORPORATION, Seongnam-si (KR)

( * ) Notice: Subject to any disclaimer, the term of this patent is extended or adjusted under 35 U.S.C. 154(b) by 850 days.

(21) Appl. No.: 15/211,749

(22) Filed: Jul. 15, 2016

(65) Prior Publication Data

US 2017/0024394 A1    Jan. 26, 2017

(30) Foreign Application Priority Data

Jul. 21, 2015    (KR) .......................... 10-2015-0102812

(51) Int. Cl.
    *H04L 29/08*    (2006.01)
(52) U.S. Cl.
    CPC .................................... *H04L 67/22* (2013.01)
(58) Field of Classification Search
    None
    See application file for complete search history.

(56) References Cited

U.S. PATENT DOCUMENTS

| 7,660,815 | B1 * | 2/2010 | Scofield | ................ | G06F 16/337 |
| | | | | | 707/999.102 |
| 7,725,453 | B1 * | 5/2010 | Chen | ..................... | G06F 16/951 |
| | | | | | 707/711 |

(Continued)

FOREIGN PATENT DOCUMENTS

| KR | 20090080209 A | * | 7/2009 |
| KR | 20100039159 A | * | 4/2010 |

(Continued)

OTHER PUBLICATIONS

Kim et al., "Topic-Driven SocialRank: Personalized search result ranking by identifying similar, credible users in a social network" Sep. 18, 2013; https://www.sciencedirect.com/science/article/pii/S095070511300289X (Year: 2013).*

*Primary Examiner* — Ashish Thomas
*Assistant Examiner* — Mellissa M. Ohba
(74) *Attorney, Agent, or Firm* — Greer Burns & Crain Ltd.

(57) ABSTRACT

A search result providing method and a system provide a real-time change in a search result. The search result method may include receiving a keyword; extracting social network service (SNS) contents corresponding to the keyword by conducting a search on contents registered to an SNS platform; determining a ranking of each of the SNS contents based on user feedback information and newness information of each of the SNS contents; and providing a search result associated with the keyword by selecting and sorting SNS contents to be displayed on a user terminal based on the rankings. The extracting and the determining may be repeatedly performed, and the providing may include dynamically moving the locations of SNS contents within the search result by selecting and sorting the SNS contents to be (Continued)

displayed on the user terminal based on a real-time change in the rankings by the repeatedly performing.

18 Claims, 9 Drawing Sheets

(56) References Cited

U.S. PATENT DOCUMENTS

| | | | | |
|---|---|---|---|---|
| 8,700,615 | B2 * | 4/2014 | Jones | H04L 67/30 |
| | | | | 707/723 |
| 8,756,224 | B2 * | 6/2014 | Dassa | G06F 16/24578 |
| | | | | 707/723 |
| 8,949,239 | B2 * | 2/2015 | Ruffner | G06F 16/93 |
| | | | | 707/738 |
| 9,532,104 | B2 * | 12/2016 | Im | H04N 21/4788 |
| 9,805,127 | B2 * | 10/2017 | Ruffner | G06F 16/93 |
| 10,120,877 | B2 * | 11/2018 | Heath | G06Q 30/02 |
| 10,127,563 | B2 * | 11/2018 | Heath | G06Q 30/02 |
| 10,649,607 | B2 * | 5/2020 | St. Clair | G06Q 50/01 |
| 2004/0034633 | A1 * | 2/2004 | Rickard | G06F 16/951 |
| 2009/0132515 | A1 * | 5/2009 | Lu | G06F 16/951 |
| 2009/0164450 | A1 * | 6/2009 | Martinez | G06F 16/951 |
| 2011/0078129 | A1 * | 3/2011 | Chunilal | G06F 8/61 |
| | | | | 707/706 |
| 2011/0225293 | A1 * | 9/2011 | Rathod | G06Q 10/00 |
| | | | | 709/224 |
| 2012/0191715 | A1 * | 7/2012 | Ruffner | G06F 16/93 |
| | | | | 707/738 |
| 2013/0073387 | A1 * | 3/2013 | Heath | G06Q 50/01 |
| | | | | 705/14.53 |
| 2013/0073389 | A1 * | 3/2013 | Heath | G06Q 50/01 |
| | | | | 705/14.54 |
| 2013/0073400 | A1 * | 3/2013 | Heath | G06Q 30/02 |
| | | | | 705/14.73 |
| 2013/0073473 | A1 * | 3/2013 | Heath | G06Q 30/02 |
| | | | | 705/319 |
| 2015/0088877 | A1 * | 3/2015 | Ruffner | G06F 16/93 |
| | | | | 707/732 |
| 2015/0186383 | A1 * | 7/2015 | Pinckney | G06N 5/048 |
| | | | | 707/748 |

FOREIGN PATENT DOCUMENTS

| | | | |
|---|---|---|---|
| KR | 10-2010-0050110 | | 5/2010 |
| KR | 20110035665 A | * | 4/2011 ....... G06F 16/24578 |

* cited by examiner

METHOD, SYSTEM AND RECORDING MEDIUM FOR PROVIDING REAL-TIME CHANGE IN SEARCH RESULT

CROSS-REFERENCE TO RELATED APPLICATION(S)

This application claims priority under 35 U.S.C. § 119 to Korean Patent Application No. 10-2015-0102812 filed Jul. 21, 2015, in the Korean Intellectual Property Office (KIPO), the entire content of which are incorporated herein by reference.

BACKGROUND

Field

One or more example embodiments relate to technology for providing a search result associated with a keyword.

Description of Related Art

Currently, with a variety of image-based services being provided, there is an increase in the user need for searching for contents associated with an image found on the Internet.

A general image search service sorts images attached with information, for example, a tag, a name, annotation, etc., that matches a keyword input from a user based on a preset criterion, and provides the sorted images. The general image search has some constraints in providing an expanded service.

In particular, existing image search services may not consider a change in a search result occurring due to an elapse of time. Thus, once a search result associated with a keyword input from a user is provided, the search result may not vary without an additional action of the user.

SUMMARY

One or more exemplary embodiments of the present invention provide a search result providing method, system, and non-transitory computer-readable medium for providing a search result in which a time-dependent real-time change aspect is applied.

One or more exemplary embodiments also provide a search result providing method, system, and non-transitory computer-readable medium for dynamically providing a search result associated with a keyword based on the newness and popularity.

One or more exemplary embodiments also provide a search result providing method, system, and non-transitory computer-readable medium for combining a social network service (SNS) with a search service and applying a document on the SNS to a search result to real time.

At least one exemplary embodiment provides a search result providing method implemented in a computer, the method including receiving a keyword; extracting SNS contents corresponding to the keyword by conducting a search on contents registered to an SNS platform; determining a ranking of each of the SNS contents based on user feedback information and newness information of each of the SNS contents; and providing a search result associated with the keyword by selecting and sorting SNS contents to be displayed on a user terminal based on the rankings. The extracting and the determining is repeatedly performed, and the providing includes dynamically moving locations of SNS contents within the search result by selecting and sorting the SNS contents to be displayed on the user terminal based on a real-time change in the rankings by the repeated performing of the extracting and the determining processes.

The extracting may include selecting at least one tag associated with the keyword, and extracting an image attached with the tag on the SNS platform.

The determining may include calculating ranking scores for determining a ranking based on user feedback count, a first time, and a second time with respect to each of the SNS contents, the first time denoting a time elapsed after receiving a recent user feedback and the second time denoting a time elapsed from a point in time at which corresponding content is created or registered.

The determining may further include calculating the ranking scores by applying, to the second time, a weight of a third time that denotes a standard time for determining the newness of the SNS content.

The determining may further include calculating the ranking scores by applying, to the first time, a weight of a fourth time that denotes an initial display maintain time for guaranteeing an initial display time of the SNS content.

The determining may include calculating user feedback count, a first time, and a second time with respect to each of the SNS contents, the first time denoting a time elapsed after receiving a recent user feedback and the second time denoting a time elapsed from a point in time at which corresponding content is created or registered; determining whether the second time has passed a third time that denotes a standard time for determining the newness of the SNS content; setting a weight value in proportion to an elapsed time of the second time as a first weight of the third time if the second time has passed the third time; and setting a default value as the first weight of the third time if the second time has not passed the third time.

The determining may further include determining whether the first time has passed a fourth time that denotes an initial display maintain time for guaranteeing an initial display time of the SNS content; setting a weight value to be in inverse proportion to the user feedback count and in proportion to the first weight as a second weight of the fourth time if the first time has passed the fourth time; and setting a default value as the second weight of the fourth time if the first time has not passed the fourth time. Ranking scores for determining the ranking may be calculated by applying the first weight of the third time and the second weight of the fourth time.

The determining may further include calculating initial ranking scores of the SNS content by adding the user feedback count and the first weight; calculating final ranking scores of the SNS content by adding a value acquired by applying the second weight to an elapsed time of the first time if the first time has passed the fourth time, the initial ranking scores, and the fourth time; and calculating the final ranking scores of the SNS content by adding the initial ranking scores and the first time if the first time has not passed the fourth time.

The providing may include sorting the SNS contents based on the rankings, and providing a desired number of top ranking SNS contents as the search result.

The extracting and the determining may be repeatedly performed at unit times with respect to the keyword, and the providing may include dynamically moving the locations of SNS contents within the search result based on the rankings determined at unit times.

At least one exemplary embodiment also provides a non-transitory computer-readable medium storing instructions for controlling a computer system to provide a search result. The instructions control the computer system to perform a method including receiving a keyword; extracting SNS contents corresponding to the keyword by conducting a search on contents registered to an SNS platform; determining a ranking of each of the SNS contents based on user feedback information and newness information of each of the SNS contents; and providing a search result associated with the keyword by selecting and sorting SNS contents to be displayed on a user terminal based on the rankings, and the extracting and the determining is repeatedly performed, and the providing includes dynamically moving locations of SNS contents within the search result by selecting and sorting the SNS contents to be displayed on the user terminal based on a real-time change in the rankings by the repeated performing of the extracting and the determining processes.

At least one exemplary embodiment also provides a search result providing system including an extractor unit configured to extract SNS contents corresponding to a keyword by conducting a search on contents registered to an SNS platform, in response to receiving the keyword; a calculator unit configured to calculate ranking scores of each of the SNS contents based on user feedback information and newness information of each of the SNS contents; and a provider unit configured to provide a search result associated with the keyword by selecting and sorting SNS contents to be displayed on a user terminal based on the rankings. A content extraction process of the extractor unit and a ranking calculation process of the calculator unit are repeatedly performed, and the provider unit is further configured to dynamically move locations of SNS contents within the search result by selecting and sorting the SNS contents to be displayed on the user terminal based on a real-time change in the rankings by the repeated performing of the content extraction process and the ranking calculation process.

The extractor unit may be further configured to select at least one tag associated with the keyword, and to extract an image attached with the tag on the SNS platform.

The calculator unit may be further configured to calculate ranking scores for determining a ranking based on user feedback count, a first time, and a second time with respect to each of the SNS contents, the first time denoting a time elapsed after receiving a recent user feedback and the second time denoting a time elapsed from a point in time at which corresponding content is created or registered.

The calculator unit may be further configured to calculate the ranking scores by applying, to the second time, a weight of a third time that denotes a standard time for determining the newness of the SNS content.

The calculator unit may be further configured to calculate the ranking scores by applying, to the first time, a weight of a fourth time that denotes an initial display maintain time for guaranteeing an initial display time of the SNS content.

The calculator unit may be further configured to calculate user feedback count, a first time, and a second time with respect to each of the SNS contents, the first time denoting a time elapsed after receiving a recent user feedback and the second time denoting a time elapsed from a point in time at which corresponding content is created or registered; determine whether the second time has passed a third time that denotes a standard time for determining the newness of the SNS content; set a weight value in proportion to an elapsed time of the second time as a first weight of the third time if the second time has passed the third time; and set a default value as the first weight of the third time if the second time has not passed the third time.

The calculator unit may be further configured to determine whether the first time has passed a fourth time that denotes an initial display maintain time for guaranteeing an initial display time of the SNS content; set a weight value to be in inverse proportion to the user feedback count and in proportion to the first weight as a second weight of the fourth time if the first time has passed the fourth time; set a default value as the second weight of the fourth time if the first time has not passed the fourth time; and calculate ranking scores for determining a ranking by applying the first weight of the third time and the second weight of the fourth time.

The calculator unit may be further configured to calculate initial ranking scores of the SNS content by adding the user feedback count and the first weight; calculate final ranking scores of the SNS content by adding a value acquired by applying the second weight to an elapsed time of the first time if the first time has passed the fourth time, the initial ranking scores, and the fourth time; and calculate the final ranking scores of the SNS content by adding the initial ranking scores and the first time if the first time has not passed the fourth time.

A content extraction process of the extractor unit and a ranking calculation process of the calculator unit may be repeatedly performed at unit times with respect to the keyword, and the provider unit may be further configured to dynamically move the locations of SNS contents within the search result based on the rankings determined at unit times.

According to some exemplary embodiments, it is possible to provide a new type of search result by providing a search result in which a time-dependent real-time change aspect is applied and by introducing a time concept to the search result.

Also, according to some exemplary embodiments, it is possible to apply real-time content to a search result by providing a dynamic search result in which the newness and the popularity are applied in association with a keyword, without an additional action after a keyword input from a user.

Also, according to some exemplary embodiments, it is possible to provide an expanded search service by combining an SNS with a search service and by including, in the search result, SNS documents that vary in real time.

Further areas of applicability will become apparent from the description provided herein. The description and specific examples in this summary are intended for purposes of illustration only and are not intended to limit the scope of the present disclosure.

BRIEF DESCRIPTION OF THE FIGURES

Exemplary embodiments of the present invention will be described in more detail with regard to the figures, wherein like reference numerals refer to like parts throughout the various figures unless otherwise specified, and wherein.

Figure 1:
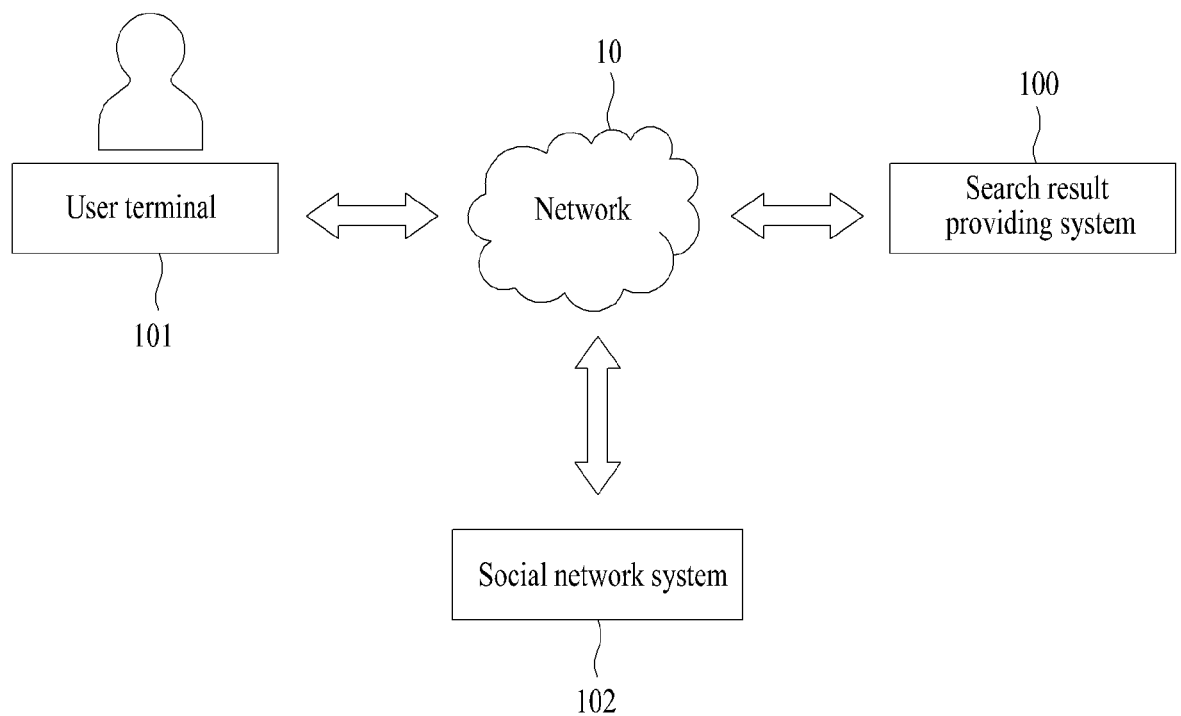
FIG. 1 is a diagram illustrating an example of a search result providing environment according to one exemplary embodiment.

It should be noted that these figures are intended to illustrate the general characteristics of methods and/or structure utilized in certain exemplary embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

One or more exemplary embodiments will be described in detail with reference to the accompanying drawings. Exemplary embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as at least one of, when preceding a list of elements, modify the entire list of elements and do not modify the individual elements of the list.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Exemplary embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more exemplary embodiments may be implemented using hardware, software, and/or a combination thereof. For example, hardware devices may be implemented using processing circuity such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more exemplary embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more exemplary embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of exemplary embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, exemplary embodiments will be described with reference to the accompanying drawings.

The exemplary embodiments relate to technology for providing a search result corresponding to a search query of a user, and may be applicable to a search engine system that provides a search service, a portable service, and the like.

The term "document" used herein indicates any type of data that is a search target in a search engine, and may include, as the search target, typical data, such as a database, atypical data, such as web data on a blog, a bulletin board, etc., and the like.

The term "image" used herein may include any type of images that may be visualized through media, such as a photo, a video, and the like, and may indicate any type of materials configured in an image form among contents present on the Internet.

FIG. 1 is a diagram illustrating an example of a search result providing environment according to one exemplary embodiment. FIG. 1 illustrates a user terminal 101, a social network system 102, and a search result providing system 100. In FIG. 1, indicators with arrowheads may indicate that data may be transmitted and received between constituent elements over a wired/wireless network 10.

The user terminal 101 may execute one or more processes that are configured to perform at least one of features described herein. The user terminal 101 may indicate any type of mobile devices capable of connecting to a website/mobile site associated with the search result providing system 100 or installing and executing a service exclusive application. Here, the user terminal 101 may perform the overall service operation, such as service screen configuration, data input, data transmission and reception, data storage, and the like, under control of the website/mobile site or the exclusive application.

For example, the user terminal 101 may be a smartphone, a tablet, a wearable computer, a personal computer (PC), a notebook computer, a laptop computer, and the like, however, is not limited thereto.

The user terminal 101 may be directly or indirectly coupled with the network 10, for example, the Internet, a local area network (LAN), and the like. For example, a PC and a notebook computer may be directly connected to the network 10 through a wired network connection. A laptop computer may be wirelessly connected to the network 10 through a wireless communication channel set between the laptop computer and a wireless access point (WAP). A smartphone may be wirelessly connected to the network 10 through a wireless communication channel set between the smartphone and a cellular network/bridge. Here, the network 10 may communicate with one or more secondary networks (not shown), for example, a LAN, a wide area network (WAN), or the Intranet, however, is not limited thereto.

The user terminal 101 may interface with the search result providing system 100 over the network 10.

The search result providing system 100 may execute one or more processes that are configured to perform at least one of the features described herein. The search result providing system 100 may provide a search service to the user terminal 101 corresponding to a client. Here, the search result providing system 100 serves as a search engine that provides a search result in response to a keyword input from a user.

In particular, when providing a search result associated with a keyword as a newly expanded concept of search service, the search result providing system 100 may provide a search environment capable of providing a search result in which a time-dependent real-time change aspect is applied.

The social network system 102 serves as a service platform that provides a social network service (SNS) to the user terminal 101 corresponding to a client. For example, the social network system 102 is configured to provide a community service based on a matter of interest using images, for example, photos, videos, and the like. Thus, the social network system 102 may provide a community space for sharing an image taken or created by the user with other users and viewing images of other users. In addition, various types of documents such as a text, a voice, and the like, may be used for a target to be shared on the SNS.

Further, the search result providing system 100 may include a document on an SNS (hereinafter, also referred to as an SNS document), for example, an image in a search result associated with the keyword in conjunction with the social network system 102. In particular, the search result providing system 100 may provide a dynamic search result by applying, to the SNS document, the newness and the popularity that varies in real time.

The search result providing system 100 and the social network system 102 may be configured as separate platforms by providing different services in independent environments. The search result providing system 100 may provide a search environment in which a search result associated with a keyword varies in real time by coupling with a social networking environment in conjunction with the social network system 102.

The search result providing system 100 corresponds to a server computer, for example, a server computing device, a PC, a series of server computers, a mini computer, and/or a main frame computer, however, is not limited thereto. The server computer may be a distributive system, and operations of the server computer may be simultaneously and/or sequentially executed on one or more processors.

The search result providing system 100 may be configured in a form of an application in which at least a portion of the constituent elements are installed on the user terminal 101. Without being limited thereto, the search result providing system 100 may be included in a platform that provides a search service in a client-server environment.

Figure 2:
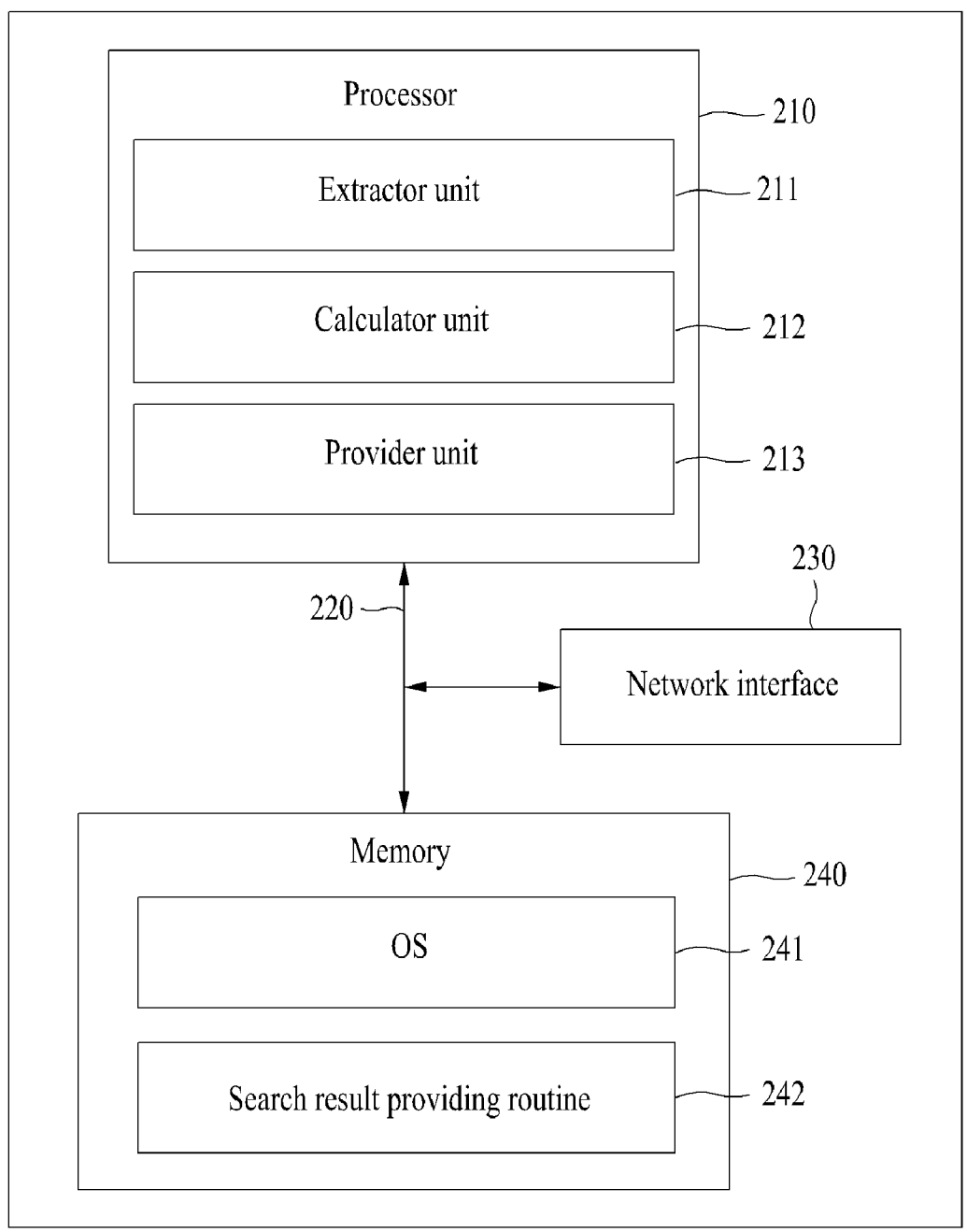
FIG. 2 is a block diagram illustrating a configuration of a search result providing system according to one exemplary embodiment.

FIG. 2 is a block diagram illustrating a configuration of the search result providing system 100 according to at least one exemplary embodiment.

Referring to FIG. 2, the search result providing system 100 includes a processor 210, a bus 220, a network interface 230, and a memory 240. The memory 240 may include an operating system (OS) 241 and a search result providing routine 242. The processor 210 may include an extractor unit 211, a calculator unit 212, and a provider unit 213. According to other example embodiments, the search result providing system 100 may include a greater or lesser number of constituent elements than the number of constituent elements shown in FIG. 2.

The memory 240 may include a permanent mass storage device, such as random access memory (RAM), read only memory (ROM), a disk drive, etc., as a computer-readable storage medium. Also, program codes (e.g., computer-readable instructions) for the OS 241 and the search result providing routine 242 may be stored in the memory 240. Such software constituent elements may be loaded from another computer-readable storage medium separate from the memory 240 using a drive mechanism (not shown). The other computer-readable storage medium may include, for example, a floppy drive, a disk, a tape, a DVD/CD-ROM drive, a memory card, etc. Software constituent elements may be loaded to the memory 240 through the network interface 230 instead of, or in addition to, the computer-readable storage medium.

The bus 220 enables communication and data transmission between the constituent elements of the search result providing system 100. The bus 220 may be configured using a high-speed serial bus, a parallel bus, a storage area network (SAN), and/or another appropriate communication technology.

The network interface 230 may be a computer hardware constituent element for connecting the search result providing system 100 to the computer network. The network interface 230 may connect the search result providing system 100 to the computer network through a wireless and/or wired connection.

The processor 210 may be configured to process computer-readable instructions of a computer program by performing a basic arithmetic operation, a logic operation, and an input/output operation of the search result providing system 100. The computer-readable instructions may be provided from the memory 240 and/or the network interface 230 to the processor 210 through the bus 220. The processor 210 may be configured to execute program codes for the extractor unit 211, the calculator unit 212, and the provider unit 213. The program codes may be stored in a storage device, such as the memory 240.

Figure 3:
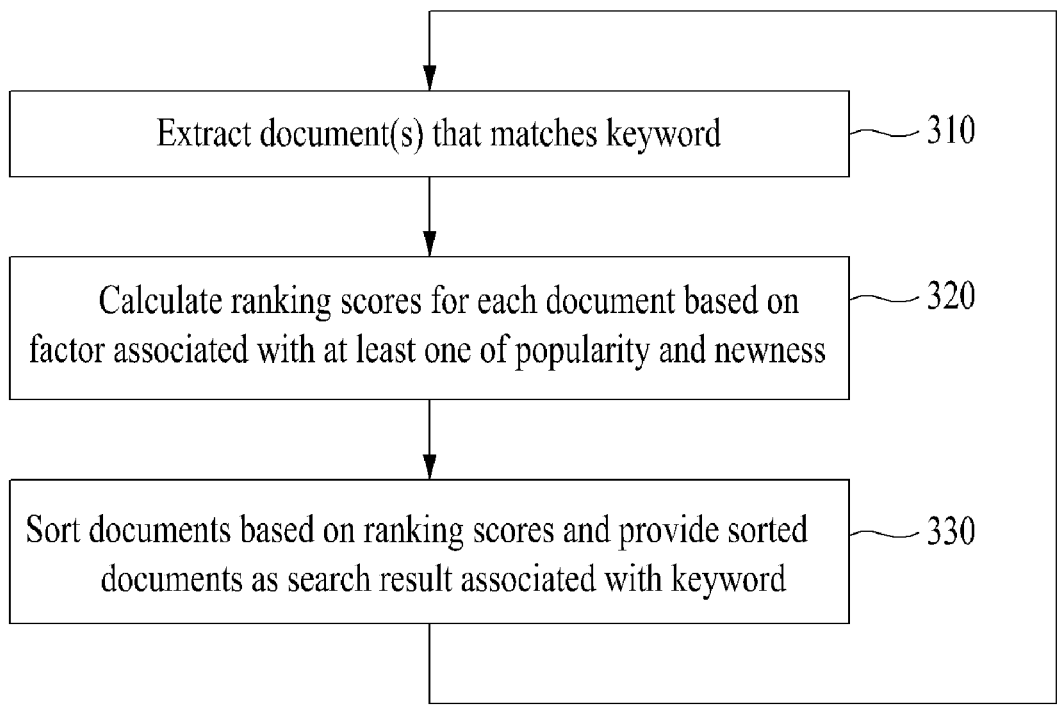
FIG. 3 is a flowchart illustrating a search result providing method according to one exemplary embodiment.

The extractor unit 211, the calculator unit 212, and the provider unit 213 may be configured to perform operations of a search result providing method of FIG. 3.

FIG. 3 is a flowchart illustrating a search result providing method according to one exemplary embodiment. Operations of the search result providing method may be performed by the extractor unit 211, the calculator unit 212, and the provider unit 213 of FIG. 2.

In operation 310, in response to a keyword input from a user terminal, the extractor unit 211 extracts a document corresponding to the keyword. The extractor unit 211 may extract a document(s) that matches the keyword from among SNS documents in conjunction with a social network system 102. That is, the extractor unit 211 may extract a search result associated with the keyword input from a user of the user terminal 101 and in this instance, may include the extracted document(s) in the search result associated with the keyword in conjunction with the social network system 102.

For example, the extractor unit 211 may extract an image (s) attached information, for example, a tag, a name, a comment, etc., that matches the keyword input from the user, from the SNS documents. The extractor unit 211 may select the input keyword as a representative tag for an image search and may extract an image(s) attached with the selected tag as the search result. The extractor unit 211 may expand the search result by selecting a related tag associated with the keyword and by extracting an image. For example, if a preset or less number of documents are extracted as the search result using the representative tag, the extractor unit 211 may expand the search result through an additional search using the related tag.

In operation 320, the calculator unit 212 may calculate ranking scores based on a user feedback for each document extracted in operation 310. Here, a user reaction to a corresponding document is applied to ranking scores for each document. The ranking scores may be acquired by calculating a factor associated with at least one of popularity and the newness of the document as scores.

For example, the calculator unit 211 may calculate ranking scores for each document by using at least one of the factors that include a number of times f that feedback, for example, 'like', 'share', 'mark', etc., from users about a corresponding document are received (hereinafter, "feedback count"), a time $t_f$ elapsed after receiving the most recent/last feedback (hereinafter, "first time"), and a time $t_c$ elapsed from a point in time at which the corresponding document is created or registered (hereinafter, "second time"). Here, the feedback count f and the first time $t_f$ may be used as a factor associated with the popularity and the second time $t_c$ may be used as a factor associated with the newness.

In operation 330, the provider unit 213 may sort documents based on ranking scores and may provide the sorted documents as the search result associated with the keyword. For example, the provider unit 213 may sort documents associated with the keyword in ascending order of the ranking scores and may display a preset number of, for example, nine top ranking documents as a final search result. Ranking scores to which the popularity and the newness are applied may be a standard used to determine a display ranking of a document. The lower the ranking scores, the higher the ranking of the document. The higher the ranking scores, the lower the ranking of the document. That is, according to an increase in the feedback count f and according to a decrease in the first time $t_f$ and the second time $t_c$, ranking scores decreases and the corresponding document is displayed in a relatively high ranking. Conversely, according to an increase in ranking scores, the corresponding document falls in the display rankings.

Operation 310 (hereinafter, also referred to as document extraction process 310) and operation 320 (hereinafter, also referred to as ranking score calculation process 320) may be repeated at intervals of a unit time, for example, 1 second. If a document sorting location varies based on ranking scores for each document, the provider unit 213 may dynamically update the search result by moving a document location to be displayed as a final search result and by applying the newness and the popularity of the document in real time.

In particular, the provider unit 213 may classify and thereby provide the search result associated with the keyword into a predetermined (or, alternatively, desired) collection, for example, news, images, a dictionary, etc. Here, the provider unit 213 may classify and thereby provide, into a separate area, SNS documents among documents included in the search result. The provider unit 213 may display a real-time change in display rankings of documents based on the newness and the popularity on a search result display area including SNS documents instead of refreshing a search result page associated with the keyword.

The search result providing method according to example embodiments may display a relatively popular document and a relatively recent document to be displayed in a relatively high ranking among SNS documents, and in this instance, may provide a search environment in which rankings of documents included in a search result automatically vary in real time without an additional action after the user inputs a keyword.

Figure 4:
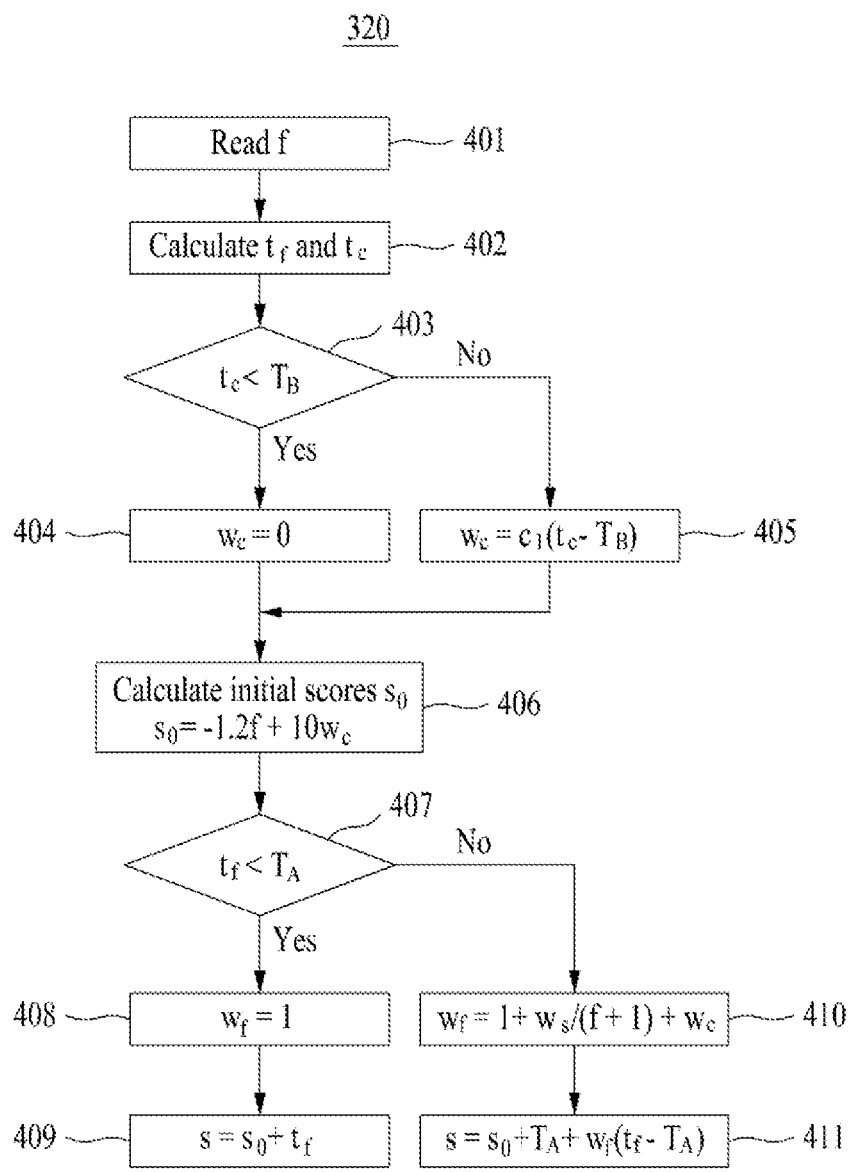
FIG. 4 is a flowchart illustrating a process of calculating ranking scores of a document according to one exemplary embodiment.

FIG. 4 is a flowchart illustrating a process of calculating ranking scores of a document according to one exemplary embodiment. Ranking score calculation process 320 is to calculate ranking scores of each document extracted as a search result and operations thereof may be performed at the calculator unit 212.

Although all of three factors, for example, feedback count f, the first time $t_f$ and the second time $t_c$ are applied to calculating ranking scores, it is only an example and without being limited thereto, it is possible to calculate ranking scores by applying at least one of the three factors.

The calculator unit 212 reads the feedback count f from users of a document in operation 401, and calculates the first time $t_f$ elapsed after receiving the most recent feedback and the second time $t_c$ elapsed from a point in time at which the corresponding document is created in operation 402.

The calculator unit 212 may directly read the feedback count f, the first time $t_f$, and the second time $t_c$ from the social network system 102, or may calculate the same based on data read from the social network system 102.

In operation 403, the calculator unit 212 determines whether the second time $t_c$ has passed a third time $t_B$. Here, the third time $t_B$ is a reference used to determine the newness of a document, and denotes a standard time, for example, 4 hours, capable of determining whether the corresponding document has been recently created.

In operation 404, if the second time $t_c$ is less than the third time $t_B$, the calculator 212 may determine that the corresponding document is a recently created document and may set a first weight $w_c$ to a default value, for example, zero. Here, the first weight $w_c$ denotes a weight according to a document creation time.

In operation 405, if the second time $t_c$ has passed the third time $t_B$, the calculator 212 may calculate the first weight $w_c$ according to Equation 1.

$$w_c = c_1(t_c - T_B) \quad \text{[Equation 1]}$$

In Equation 1, $w_c$ denotes the first weight, $c_1$ denotes an increase speed constant according to a document creation time, $t_c$ denotes the second time, and $T_B$ denotes the third time.

Accordingly, it is possible to determine the newness of a document using the second time $t_c$. Here, ranking scores of a recent document may gradually increase and, if the third time $T_B$ is elapsed, and may quickly increase by applying the first weight $w_c$ calculated according to Equation 1. That is, a display ranking of a relatively old document may fall faster.

In operation 406, the calculator unit 212 calculates initial scores $s_0$ of the document based on the first weight $w_c$ calculated in operations 404 and 405. For example, the initial scores $s_0$ may be defined according to Equation 2.

$$s_0 = -1.2f + 10w_c \quad \text{[Equation 2]}$$

In Equation 2, $s_0$ denotes initial scores, f denotes feedback count, and $w_c$ denotes the first weight.

The initial scores $s_0$ enable a recent document having relatively large feedback count f to be displayed in an upper ranking when the document is initially displayed. That is, the initial scores $s_0$ may affect ranking scores when a document is initially displayed immediately after receiving a feedback. The initial scores $s_0$ enables a document having relatively small feedback count f or old document not to be easily displayed in an upper ranking at the moment of receiving a feedback.

In operation 407, the calculator unit 212 may determine whether the first time $t_f$ elapsed after receiving a recent feedback about the document has passed a fourth time $T_A$. Here, the fourth time $T_A$ denotes an initial display maintain time for guaranteeing an initial display time of the document. The fourth time $T_A$ enables the document to be maintained in a relatively upper ranking by relatively slowly increasing ranking scores immediately after receiving a feedback.

Ranking scores of a document may increase over time from a point in time at which the document is initially created or a feedback is received from a user. In this instance, the document may be maintained to be displayed in an upper ranking during a preset period of time using the fourth time $T_A$. Without the initial display maintain time, the document may appear in an upper ranking of the search result and then disappear soon, which may be regarded as a sudden change. Accordingly, through the initial display maintain time, the user may have an appropriately sufficient time to verify high ranking documents.

If the first time $t_f$ is less than the fourth time $T_A$, the calculator unit 212 sets a second weight $w_f$ to a default value, for example, 1, in operation 408, and calculates final ranking scores s according to Equation 3 in operation 409. The second weight $w_f$ denotes a weight according to the first time $t_f$.

$$s = s_0 + t_f \times w_f \quad \text{[Equation 3]}$$

In Equation 3, s denotes the final ranking scores, $s_0$ denotes the initial scores, $t_f$ denotes the first time, and $w_f$ denotes the second weight.

If the first time $t_f$ has passed the fourth time $T_A$, the calculator unit 212 calculates the second weight $w_f$ according to Equation 4 in operation 410, and calculates the final ranking scores s according to Equation 5 in operation 411.

$$w_f = 1 + w_s/(f+1) + w_c \quad \text{[Equation 4]}$$

$$s = s_0 + T_A + w_f(t_f - T_A) \quad \text{[Equation 5]}$$

In Equation 4, $w_f$ denotes the second weight, $w_s$ denotes an increase speed constant according to feedback, f denotes the feedback count, and $w_c$ denotes the first weight.

Here, to calculate ranking scores when feedback count f=1, that is, immediately after the document is created, f+1 acquired by adding '1' to the feedback count f may be used.

In Equation 5, s denotes the final ranking scores, $s_0$ denotes the initial scores, $T_A$ denotes the fourth time, $w_f$ denotes the second weight, and $t_f$ denotes the first time.

The ranking scores s may slowly increase during the fourth time $T_A$ corresponding to the initial display maintain time, and may quickly increase after the fourth time $T_A$. Accordingly, a display ranking of the corresponding document may also quickly fall. An increase speed of the ranking scores s is in inverse proportion to the feedback count f and is in proportion to the first time $t_f$ and the second time $t_c$. That is, according to a decrease in the feedback count f, and according to an increase in the first time $t_f$ and the second time $t_c$, ranking scores may quickly increase, thereby dropping in ranking quickly.

Accordingly, the calculator unit 212 may calculate a ranking of a document to which the newness and the popularity are simultaneously applied, using the feedback count f, the first time $t_f$, and the second time $t_c$. The calculator unit 212 may calculate ranking scores for each document by repeating the above process with respect to each document at intervals of a unit time.

Figure 5:
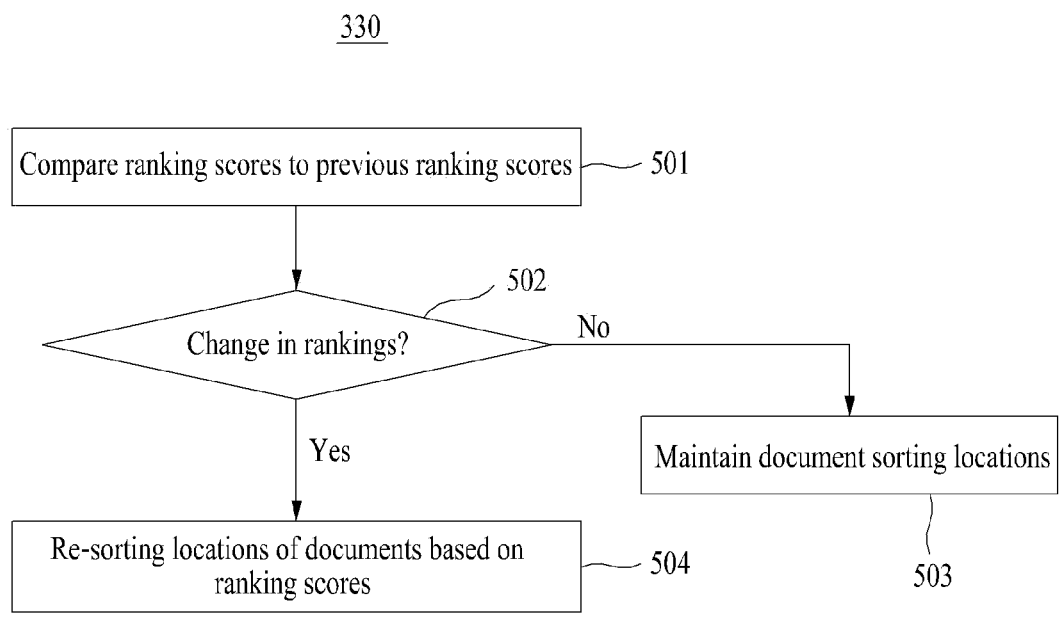
FIG. 5 is a flowchart illustrating a process of displaying a search result according to one exemplary embodiment.

FIG. 5 is a flowchart illustrating a process of displaying a search result according to one exemplary embodiment. The search result display process 330 is to provide a dynamic search result based on ranking scores for each document calculated at intervals of a unit time. Operations included in the search result display process 330 may be performed at the provider unit 213.

In operation 501, the provider unit 213 compares ranking scores for each document calculated at intervals of a unit time to previous ranking scores.

In operation 502, the provider unit 213 determines whether a ranking for each document is changed through comparison to the previous ranking scores. If the ranking is not changed, the provider unit 213 maintains a previous search result by maintaining the sorting locations of documents in operation 503.

If a document ranking is changed in comparison to a previous ranking, the provider unit 213 applies a dynamic change to the search result by re-sorting the locations of documents based on recent ranking scores in operation 504.

Accordingly, the provider unit 213 may provide a dynamic search result associated with a keyword by automatically re-sorting locations of documents at intervals of a unit time.

Figure 6:
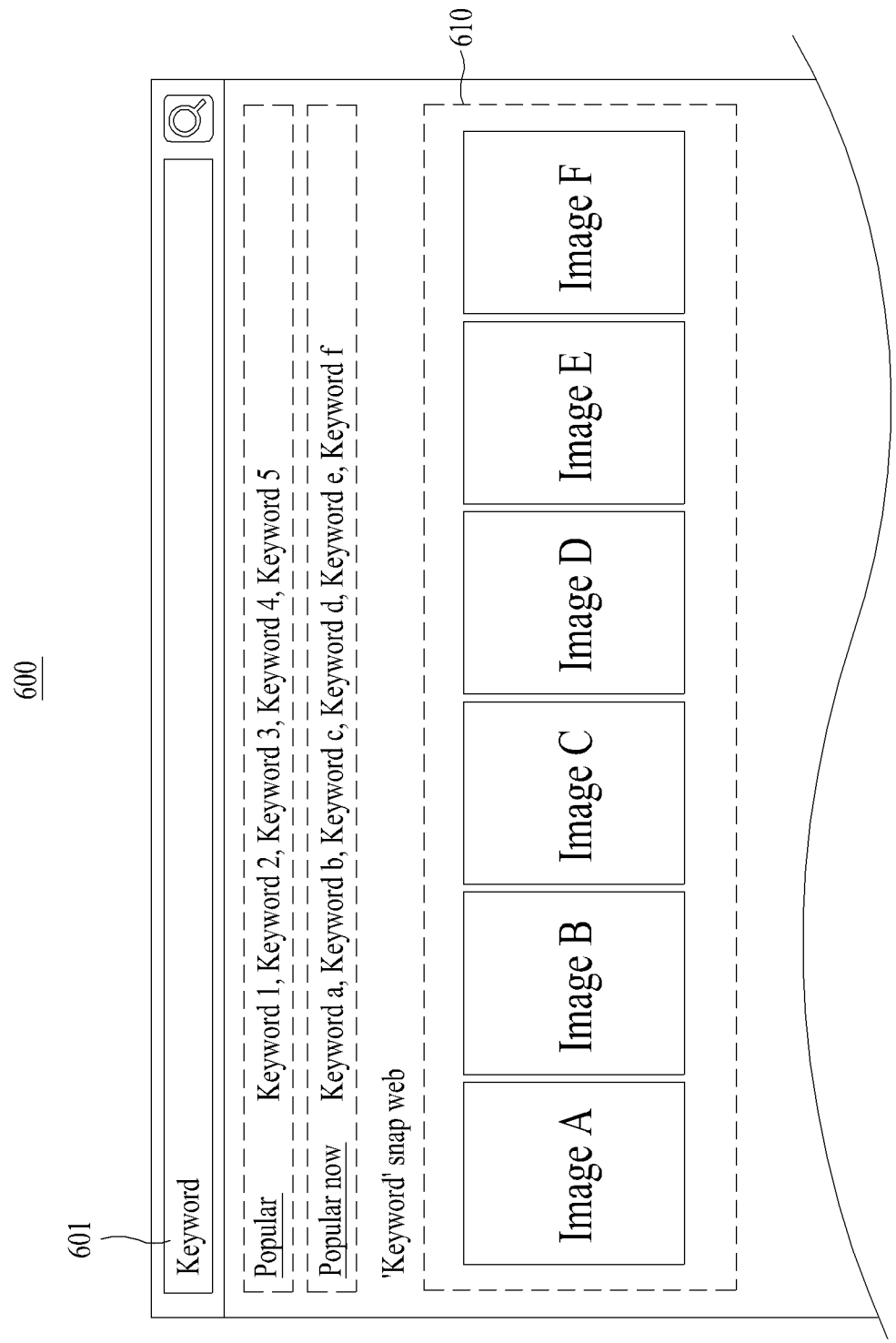
FIGS. 6 through 8 illustrate examples of a user interface screen for displaying a search result according to at least one exemplary embodiment.

FIG. 6 illustrates an example of a search result screen 600 displayed on the user terminal 101 as a user interface associated with a search result display procedure according to one exemplary embodiment.

Referring to FIG. 6, the search result screen 600 may display SNS documents, for example, images, corresponding to a keyword 601 as a search result 610 about the keyword 601. Here, the search result 610 may include documents that are sorted based on rankings to which the popularity and the newness are applied.

Figure 7:
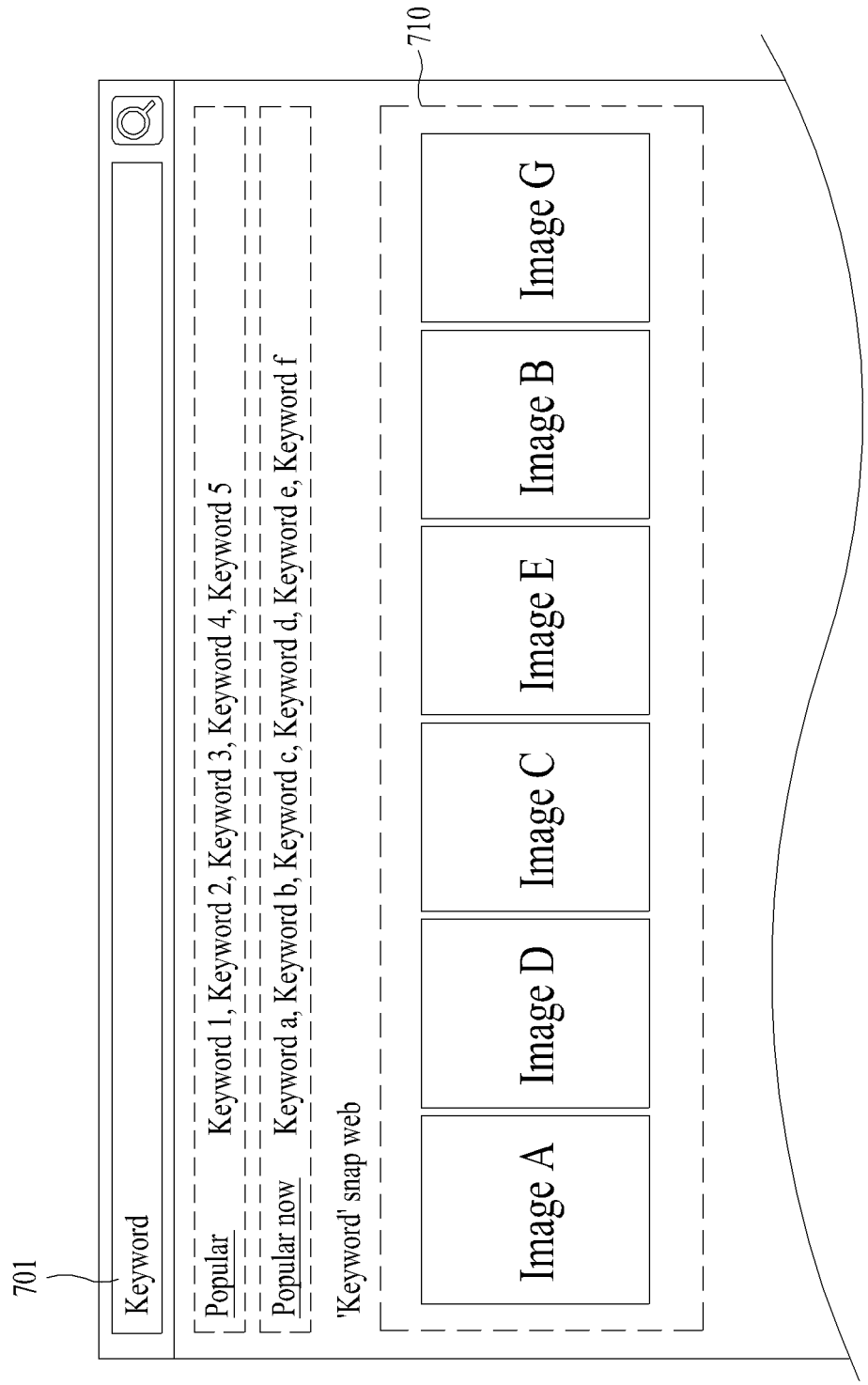

If a unit time is elapsed without an additional action or a keyword change from the user after the user inputs the keyword 601 and verifies the search result 610, it is possible to apply a real-time change in rankings of documents to a search result 710 with respect to the same keyword 701 as shown in FIG. 7. That is, real-time rankings according to the popularity and the newness may be applied to the search result 710 at intervals of a unit time.

SNS documents corresponding to the keyword 601 may be classified into a separate collection, for example, an SNS collection and displayed on the search result screen 600. Here, rankings, varying in real time every unit time, may be applied to the SNS collection instead of refreshing the entire search result associated with the keyword 601.

Figure 8:
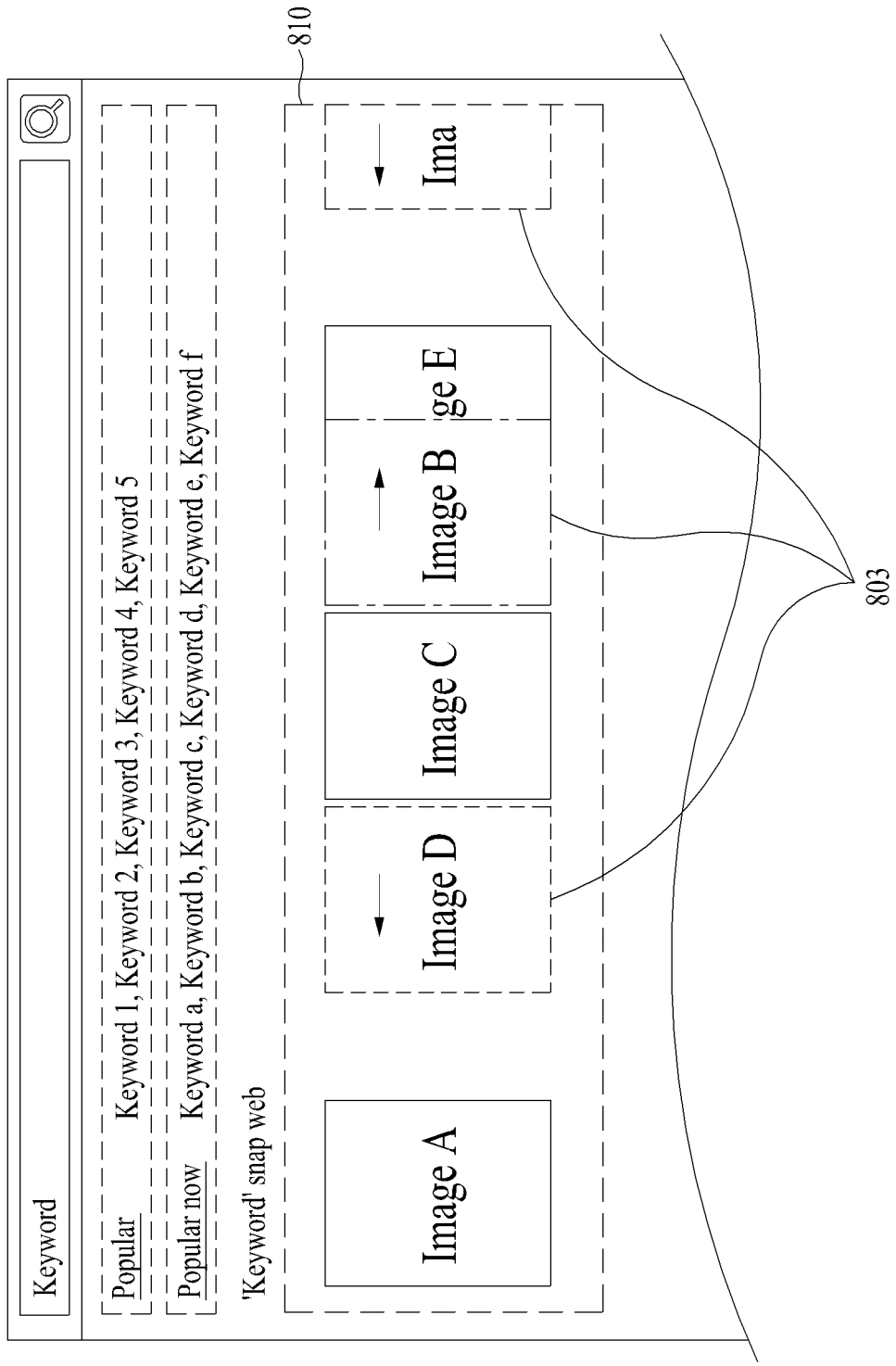

Referring to FIG. 8, a display effect that represents a location movement using an animation and the like may be applied to documents 803 of which rankings vary every unit time in a search result 810. Thus, the user may easily recognize a dynamic change in the search result 810. Here, it is possible to represent a movement direction of a document using the display effect. Also, it is possible to distinguishingly represent a document that is relocated in the search result 810, a document that is newly added to the search result 810, a document that disappears in the search result 810, and the like.

The search result providing method according to exemplary embodiments may include a further reduced number of operations or additional operations based on the detailed description made with reference to FIGS. 1 through 8. Also, two or more operations thereof may be combined and orders or locations of operations may be changed.

The screens of FIGS. 6 through 8 are provided as examples only to help the understanding of the disclosure and configurations, orders, etc., of the screens may be changed.

Figure 9:
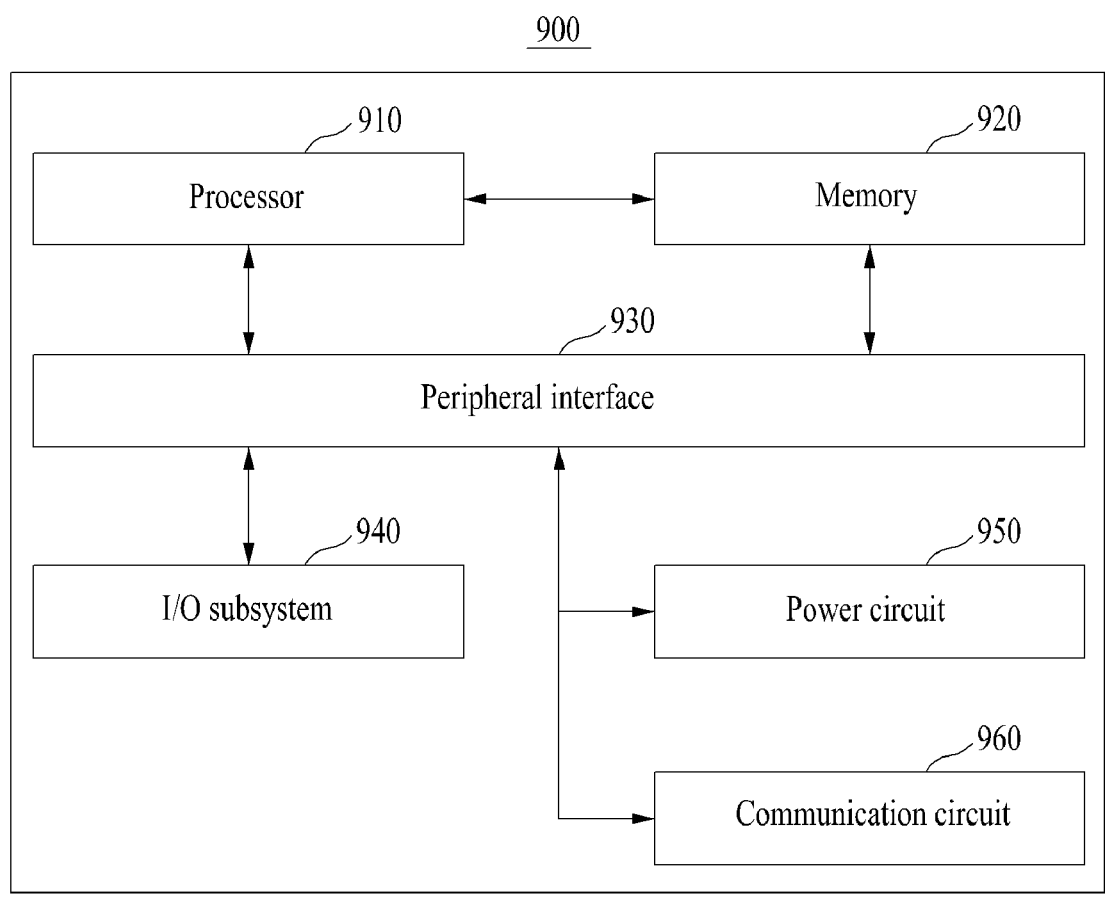
FIG. 9 is a block diagram illustrating an example of a configuration of a computer system according to one exemplary embodiment.

FIG. 9 is a block diagram illustrating a configuration of a computer system according to at least one example embodiment. Referring to FIG. 9, a computer system 900 includes at least one processor 910, a memory 920, a peripheral interface 930, an input/output (I/O) subsystem 940, a power circuit 950, and a communication circuit 960. The computer system 900 may correspond to the user terminal 101.

The memory 920 may include, for example, a high-speed random access memory (HSRAM), a magnetic disk, a static random access memory (SRAM), a dynamic RAM (DRAM), read only memory (ROM), a flash memory, and a non-volatile memory. The memory 920 may include a software module, an instruction set, or a variety of data required for an operation of the computer system 900. Here, an access from another component such as the processor 910 and the peripheral interface 930 to the memory 920 may be controlled by the processor 910.

The peripheral interface 930 may couple an input device and/or an output device of the computer system 900 with the processor 910 and the memory 920. The processor 910 may perform a variety of functions for the computer system 900 and process data by executing the software module or the instruction set stored in the memory 920.

The I/O subsystem 940 may couple various I/O peripheral devices with the peripheral interface 930. For example, the I/O subsystem 940 may include a controller for coupling the peripheral interface 930 and a peripheral device, such as a monitor, a keyboard, a mouse, a printer, and a touch screen or a sensor depending on a necessity. The I/O peripheral devices may be coupled with the peripheral interface 930 without using the I/O subsystem 940.

The power circuit 950 may supply power to all of or a portion of components of a terminal. For example, the power circuit 950 may include a power management system, at least one power source such as a battery and alternating circuit (AC), a charge system, a power failure detection circuit, a power converter or inverter, a power status indicator, or other components for creating, managing and distributing power.

The communication circuit 960 enables communication with another computer system using at least one external port. Alternatively, as described above, the communication circuit 960 may enable communication with another computer system by including a radio frequency (RF) circuit and thereby transmitting and receiving an RF signal known as an electromagnetic signal.

The embodiment of FIG. 9 is only an example of the computer system 900. The computer system 900 may have a configuration or an arrangement for omitting a portion of the components illustrated in FIG. 9, further including components not illustrated in FIG. 9, or coupling two or more components. For example, a computer system for a communication terminal of a mobile environment may further include a touch screen, a sensor, and the like, in addition to the components of FIG. 9. A circuit for RF communication using a variety of communication methods, for example, wireless fidelity (Wi-Fi), 3rd generation (3G), long term evolution (LTE), Bluetooth, near field communication (NFC), and ZigBee, may be included in the communication circuit 960. Components includable in the computer system 900 may be configured as hardware that includes an integrated circuit specified for at least one signal processing or application, software, or a combination of hardware and software.

As described above, according to exemplary embodiments, it is possible to provide a new type of search result by providing a search result in which a time-dependent real-time change aspect is applied and by introducing a time concept to the search result. Also, according to the exemplary embodiments, it is possible to apply real-time content to a search result by providing a dynamic search result in which the newness and the popularity are applied in association with a keyword, without an additional action after a keyword input from a user. Also, according to the exemplary embodiments, it is possible to provide an expanded search service by combining an SNS with a search service and by including, in the search result, SNS documents that vary in real time.

The methods according to the exemplary embodiments may be recorded in non-transitory computer-readable media in a program instruction form executable through a variety of computer systems.

The program according to the exemplary embodiments may be configured in a PC-based program or an application exclusive for a mobile terminal. An application associated with a search service may be configured as an independently operating program form or an in-app form of a specific application to be operable on the application.

Also, the methods according to the exemplary embodiments may be performed in such a manner that an application associated with a server system providing a search service controls a user terminal. For example, the application may execute one or more processors configured to perform at least one of the aforementioned features. Also, the application may be installed in the user terminal through a file provided from a file distribution system. For example, the file distribution system may include a file transmitter (not shown) to transmit the file in response to a request of the user terminal.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A search result providing method implemented in a computer, the method comprising:

receiving a keyword;

extracting social network service (SNS) documents corresponding to the keyword by conducting a search on documents registered to an SNS platform;

determining a ranking of each of the SNS documents relative to each other based on user feedback information and newness information corresponding to an elapse of time from the creation or registration of each of the SNS documents;

providing a search result associated with the keyword by selecting and sorting SNS documents to be displayed on a user terminal according to the rankings based on the user feedback information and the newness information;

repeatedly performing the extracting of the SNS documents and the determining of the ranking of each of the SNS documents based on updated user feedback information and updated newness information; and providing an updated search result from the search result associated with the keyword by selecting and sorting SNS documents to be displayed on the user terminal according to the rankings obtained by the repeated performance of the extracting of the SNS documents and the determining of the ranking of each of the SNS documents based on the updated user feedback information and the updated newness information, wherein the updated search result is provided automatically without a user input request to provide the updated search result, and wherein the determining of the ranking of each of the SNS documents comprises, calculating user feedback count, a first time, and a second time with respect to each of the SNS documents, the first time denoting a time elapsed after receiving a recent user feedback and the second time denoting the time elapsed from a point in time at which corresponding SNS document is created or registered, determining whether the second time has passed a third time that denotes a standard time for determining a newness of the corresponding SNS document, setting a weight value in proportion to the elapsed time of the second time as a first weight of the third time if the second time has passed the third time, setting a default value as the first weight of the third time if the second time has not passed the third time, determining whether the first time has passed a fourth time that denotes an initial display maintain time for guaranteeing an initial display time of the corresponding SNS document, setting a weight value to be inverse proportion to the user feedback count and in proportion to the first weight as a second weight of the fourth time if the first time has passed the fourth time, and setting a default value as the second weight of the fourth time if the first time has not passed the fourth time.

2. The method of claim 1, wherein the extracting of the SNS documents comprises selecting at least one tag associated with the keyword, and extracting an image attached with the tag on the SNS platform.

3. The method of claim 1, wherein the determining of the ranking of each of the SNS documents comprises calculating ranking scores for determining the ranking based on user feedback count, a first time, and a second time with respect to each of the SNS documents, the first time denoting a time elapsed after receiving a recent user feedback and the second time denoting the time elapsed from a point in time at which corresponding SNS document is created or registered.

4. The method of claim 3, wherein the determining of the ranking of each of the SNS documents further comprises calculating the ranking scores by applying, to the second time, a weight of a third time that denotes a standard time for determining a newness of the corresponding SNS document.

5. The method of claim 3, wherein the determining of the ranking of each of the SNS documents further comprises calculating the ranking scores by applying, to the first time, a weight of a fourth time that denotes an initial display maintain time for guaranteeing an initial display time of the corresponding SNS document.

6. The method of claim 1, wherein ranking scores for determining the ranking is calculated by applying the first weight of the third time and the second weight of the fourth time.

7. The method of claim 6, wherein the determining of the ranking of each of the SNS documents further comprises:

calculating initial ranking scores of the corresponding SNS document by adding the user feedback count and the first weight;

calculating final ranking scores of the corresponding SNS document by adding a value acquired by applying the second weight to an elapsed time of the first time if the first time has passed the fourth time, the initial ranking scores, and the fourth time; and calculating the final ranking scores of the corresponding SNS document by adding the initial ranking scores and the first time if the first time has not passed the fourth time.

8. The method of claim 1, wherein the providing of the search result comprises sorting the SNS documents based on the rankings, and providing a desired number of top ranking SNS documents as the search result.

9. The method of claim 8, wherein the extracting of the SNS documents and the determining of the ranking of each of the SNS documents are repeatedly performed at unit times with respect to the keyword, and the providing of the updated search result comprises dynamically moving the locations of the SNS documents within the search result based on the rankings determined at the unit times.

10. A non-transitory computer-readable medium storing instructions for controlling a computer system to provide a search result, the instructions controlling the computer system to implement a method comprising:

receiving a keyword;

extracting social network service (SNS) documents corresponding to the keyword by conducting a search on documents registered to an SNS platform;

determining a ranking of each of the SNS documents relative to each other based on user feedback information and newness information corresponding to an elapse of time from the creation or registration of each of the SNS documents;

providing a search result associated with the keyword by selecting and sorting SNS documents to be displayed on a user terminal accordingly to the rankings based on the user feedback information and the newness information;

repeatedly performing the extracting of the SNS documents and the determining the ranking of each of the SNS documents based on updated user feedback information and updated newness information; and providing an updated search result from the search result associated with the keyword by selecting and sorting SNS documents to be displayed on the user terminal according to the rankings obtained by the repeated performance of the extracting of the SNS documents and the determining of the ranking of each of the SNS documents based on the updated user feedback information and the updated newness information, wherein the updated search result is provided automatically without a user input request to provide the updated search result, and wherein the determining of the ranking of each of the SNS documents comprises, calculating user feedback count, a first time, and a second time with respect to each of the SNS documents, the first time denoting a time elapsed after receiving a recent user feedback and the second time denoting the time elapsed from a point in time which corresponding SNS document is created or registered, determining whether the second time has passed a third time that denotes a standard time for determining a newness of the corresponding SNS document, setting a weight value in proportion to the elapsed time of the second time as a first weight of the third time if the second time has passed the third time, setting a default value as the first weight of the third time if the second time has not passed the third time, determining whether the first time has passed a fourth time that denotes an initial display maintain time for guaranteeing an initial display time of the corresponding SNS document, setting a weight value to be in inverse proportion to the user feedback count and in proportion to the first weight as a second weight of the fourth time if the first time has passed the fourth time, and setting a default value as the second weight of the fourth time if the first time has not passed the fourth time.

11. A search result providing system comprising:

a non-transitory computer readable recording medium for storing instructions for providing a search result; and a processor, in communication with the recording medium, including a plurality of functional units each for executing the instructions stored in the recording medium, the functional units including, an extractor unit configured to extract social network service (SNS) documents corresponding to a keyword by conducting a search on documents registered to an SNS platform, in response to receiving the keyword;

a calculator unit configured to calculate ranking scores of each of the SNS documents relative to each other based on user feedback information and newness information corresponding to an elapse of time from the creation or registration of each of the SNS documents; and a provider unit configured to provide a search result associated with the keyword by selecting and sorting SNS documents to be displayed on a user terminal according to the rankings based on the user feedback information and the newness information;

wherein the extracting of the SNS documents and the determining of the ranking of each of the SNS documents based on updated user feedback information and updated newness information are repeatedly performed, and the provider unit is further configured to provide an updated search result from the search result associated with the keyword by selecting and sorting SNS documents to be displayed on the user terminal according to the rankings obtained by the repeated performance of the extracting of the SNS documents and the determining of the ranking of each of the SNS documents based on the updated user feedback information and the updated newness information, wherein the updated search result is provided automatically without a user input request to provide the updated search result, wherein the calculator unit is further configured to calculate user a feedback count, a first time, and a second time with respect to each of the SNS documents, the first time denoting a time elapsed after receiving a recent user feedback and the second time denoting the time elapsed from a point in time at which corresponding document is created or registered, determine whether the second time has passed a third time that denotes a standard time for determining a newness of corresponding SNS document, set a weight value in proportion to the elapsed time of the second time as a first weight of the third time if the second time has passed the third time, set a default value as the first weight of the third time if the second time has not passed the third time, determine whether the first time has passed a fourth time that denotes an initial display maintain time for guaranteeing an initial display time of the corresponding SNS document, set a weight value to be in inverse proportion to the user feedback count and in proportion to the first weight as a second weight of the fourth time if the first time has passed the fourth time, and set a default value as the second weight of the fourth time if the first time has not passed the fourth time.

12. The search result providing system of claim 11, wherein the extractor unit is further configured to select at least one tag associated with the keyword, and to extract an image attached with the tag on the SNS platform.

13. The search result providing system of claim 11, wherein the calculator unit is further configured to calculate ranking scores for determining the ranking based on user feedback count, a first time, and a second time with respect to each of the SNS documents, the first time denoting a time elapsed after receiving a recent user feedback and the second time denoting the time elapsed from a point in time at which corresponding SNS document is created or registered.

14. The search result providing system of claim 13, wherein the calculator unit is further configured to calculate the ranking scores by applying, to the second time, a weight of a third time that denotes a standard time for determining a newness of the corresponding SNS document.

15. The search result providing system of claim 13, wherein the calculator unit is further configured to calculate the ranking scores by applying, to the first time, a weight of a fourth time that denotes an initial display maintain time for guaranteeing an initial display time of the corresponding SNS document.

16. The search result providing system of claim 11, wherein the calculator unit is further configured to calculate ranking scores for determining a ranking by applying the first weight of the third time and the second weight of the fourth time.

17. The search result providing system of claim 16, wherein the calculator unit is further configured to calculate initial ranking scores of the corresponding SNS document by adding the user feedback count and the first weight;

calculate final ranking scores of the corresponding SNS document by adding a value acquired by applying the second weight to an elapsed time of the first time if the first time has passed the fourth time, the initial ranking scores, and the fourth time; and calculate the final ranking scores of the corresponding SNS document by adding the initial ranking scores and the first time if the first time has not passed the fourth time.

18. The search result providing system of claim 11, wherein the extracting of the SNS documents and the determining of the ranking of each of the SNS documents are repeatedly performed at unit times with respect to the keyword, and the provider unit is further configured to dynamically move the locations of SNS documents within the search result based on the rankings determined at unit times to provide the updated search result.

* * * * *